United States Patent [19]

Johnson

[11] 4,438,688
[45] Mar. 27, 1984

[54] NUTCRACKER

[76] Inventor: Paul E. Johnson, 4123 Jasper Rd., Springfield, Oreg. 97477

[21] Appl. No.: 473,127

[22] Filed: Mar. 7, 1983

[51] Int. Cl.³ .............................................. A23N 5/00
[52] U.S. Cl. ...................................... 99/574; 99/579; 99/583; 99/618
[58] Field of Search .......................... 99/568, 571–576, 99/579, 581–583, 617, 618, 622; 241/227, 228, 85, 100, 239; 30/120.1–120.5

[56] References Cited

U.S. PATENT DOCUMENTS

| | | |
|---|---|---|
| 1,330,442 | 2/1920 | Futch . |
| 1,834,347 | 12/1931 | Nixon ................................... 99/579 |
| 2,144,841 | 1/1939 | Glaser ................................... 99/574 |
| 2,226,272 | 12/1940 | Wadsworth . |
| 2,324,382 | 7/1943 | Goodwin . |
| 2,954,810 | 10/1960 | Bond ..................................... 99/574 |
| 4,353,931 | 10/1982 | Volk, Sr. .......................... 99/574 X |

*Primary Examiner*—Timothy F. Simone
*Attorney, Agent, or Firm*—James D. Givnan, Jr.

[57] ABSTRACT

An inclined chute is attachable to a support by means of a base including a clamping arrangement. An inclined base portion supports said chute and also a pair of bearing posts. A drum disposed within the chute is journaled within the bearing posts. Adjustment means enable axial positioning of the bearing posts for adjusting drum and chute clearance to accommodate various sized nuts. A handle imparts rotation to the drum.

4 Claims, 2 Drawing Figures

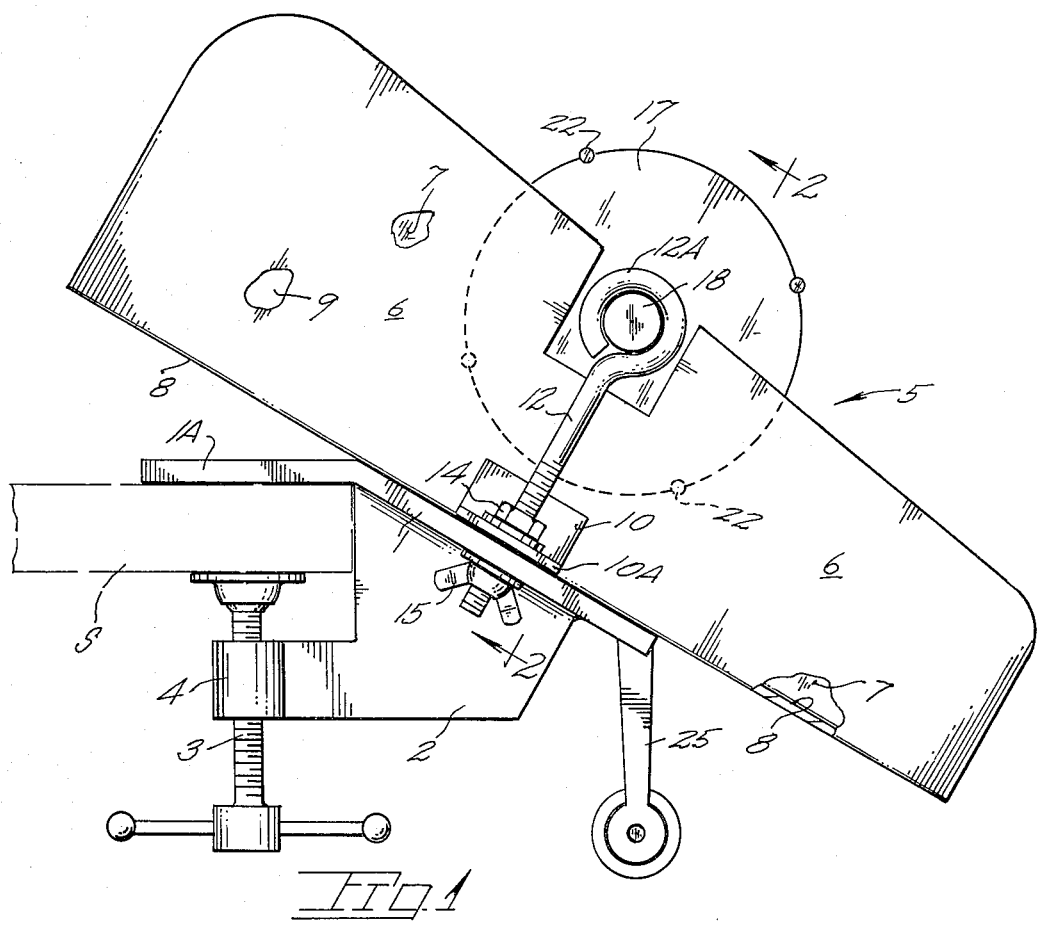
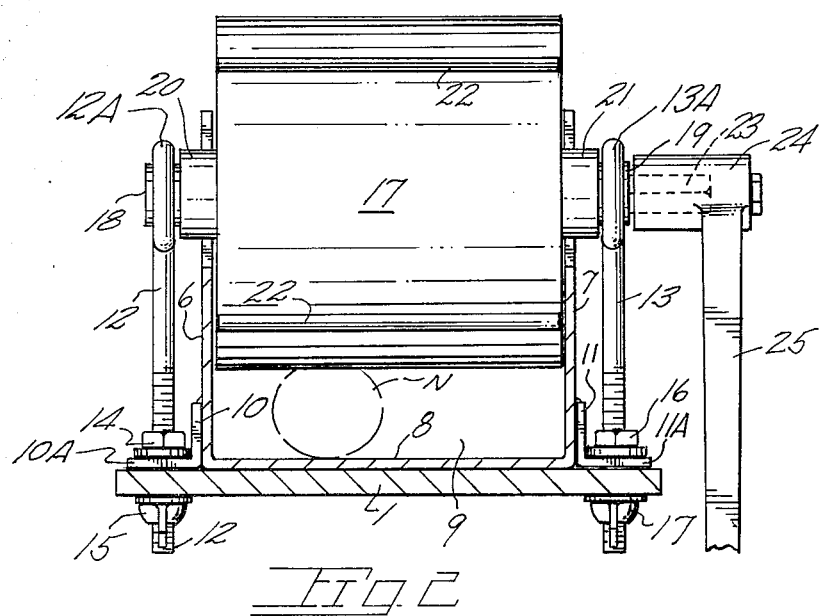

NUTCRACKER

BACKGROUND OF THE INVENTION

The present invention pertains to a household device for the cracking of a variety of nuts.

The known prior art discloses many types of nutcracking machines, most of which appear to be suitable for commercial use by reason of their size and complexity. Such devices may include drums having irregular surfaces thereon which cooperate with a radially offset wall surface to compress a nut therebetween ultimately cracking the nut shell. U.S. Pat. No. 1,834,347 discloses a rotary cylinder which acts conjointly with a stationary adjustable barrier to urge nuts through a restricted area resulting in shell fracture. The barrier is adjustable relative the periphery of the rotary cylinder to enable use of the machine for cracking different varieties of nuts. The rotary member has an irregular periphery with projections thereon to promote frictional contact with the nut shell.

U.S. Pat. No. 1,999,569 discloses a rotary drum with lengthwise extending ribs which coact with a stationary housing to progressively separate and extrude a bean "meat" from the bean shell portion.

U.S. Pat. No. 2,543,537 discloses a nutcracking machine having a first drum rotatable about a fixed axis and a second or outer drum disposed thereabout with the outer drum being adjustable to provide a variable gap between the drum peripheries to enable the cracking of different varieties of nuts. Both drums are provided with irregular surfaces for positive shell contact.

SUMMARY OF THE PRESENT INVENTION

The present invention is embodied within a nutcracker for kitchen use adaptable to the cracking of various types of nuts.

The present device includes a chute having a bottom and side walls and within which is mounted a rotatable drum which coacts with the chute bottom wall to crack the nutshells. Bearing posts, shown as eye bolts, adjacent the sides of the chute are adjustable to vary the spacing between the drum and chute bottom wall to accommodate and crack different sized nuts. A base has an inclined segment on which the chute is mounted by eye bolt mounted fasteners which additionally serve to adjustably support the bearing posts. Said base incorporates a clamping arrangement for temporary securement of the nutcracker to a support.

Important objectives of the present nutcracker include the provision of a nutcracker having adjustable bearing posts which permit convenient adjusted positioning of the nutcracker drum relative to a wall surface to permit adapting of the device for cracking various types of nuts; the provision of a device of low manufacturing cost wherein bearing posts are embodied within eye bolts which serve to rotatably support a drum component as well as serving to secure a chute component to the nutcracker base; the provision of a nutcracker wherein the bearing posts may be axially adjusted with slight variances in bearing post heights not being critical to drum rotation.

BRIEF DESCRIPTION OF THE DRAWING

In the accompanying drawing:

FIG. 1 is a side elevational view of the present nutcracker; and

FIG. 2 is a vertical sectional view taken approximately along line 2—2 of FIG. 1.

DETAILED DESCRIPTION OF THE PREFERRED EMBODIMENT

With continuing attention to the drawing wherein applied reference numerals indicate parts hereinafter similarly identified, the reference numeral 1 indicates a base plate of the present nutcracker with the base including an angulated portion 1A for supported placement on a support S.

Secured to the underside of base plate 1 is a clamping plate 2 which, along with angulated portion 1A defines a bite area within which is received support S. A clamping member 3 is threaded within a collar 4 of the clamping plate.

In place on base 1 is a chute generally at 5 having a pair of side walls 6 and 7 and a bottom wall 8. The chute is of U-shape section with an upper interior chute area at 9 constituting a hopper for reception of a quantity of nuts N. Suitably secured to each side wall is an angular bracket at 10 and 11 having an outwardly directed flange 10A–11A which is in coplanar abutment with base plate 1.

Bearing posts at 12 and 13 extend through apertures in flanges 10A–11A and through apertures in the base plate. The bearing posts are preferably embodied in eye bolts each having and eye at 12A–13A. Pairs of fasteners at 14 and 15, 16 and 17 in place on the bearing posts serve to adjustably couple the posts to the base plate. Additionally, the fastener elements serve to confine brackets 10 and 11 in place to securely mount the chute 5 to said base plate.

A drum 17 substantially occupies the chute width with drum spindles at 18 and 19 journaled within an eye 12A–13A. Open areas 6A–7A in the chute walls permit drum adjustment. Said drum additionally includes spacer arrangements at 20 and 21.

In place on the drum periphery are crosswise extending ribs 22 which project from the drum surface approximately one-eighth of an inch. A stub shaft 23 extends outwardly from drum spindle 19 and is squared to receive a boss 24 on a handle 25 having a rotatable handgrip 26.

The nutcracker is readily adjusted to various types of nuts by adjustment of the pairs of fastening elements 14-15 and 16-17 to extend or retract their respective eye bolts 12 and 13. The drum rib 22 to chute bottom wall 8 clearance is accordingly set to permit passage of those nuts having a reduced size by reason of fracture. The ribs 22 in conjunction with the adjacent drum surface serve to "trap" the nut against chute bottom wall 8 whereafter further drum rotation causes the rib to crack the nut shell.

For convenience sake, the lower fastening elements 15 and 17 are preferably wing nuts. The use of angular brackets 10 and 11 permit convenient attachment of chute 5 to base plate 1 by the eye bolt and fastener elements.

While I have shown but one embodiment of the invention it will be apparent to those skilled in the art that the invention may be embodied still otherwise without departing from the spirit and scope of the invention.

Having thus descrived the invention, what is desired to be secured under a Letters Patent is:

I claim:

1. A nutcracker for temporary attachment to a supporting surface during use and comprising in combination,
   a base including a clamping member adapted for engagement with a supporting surface, said base having an angulated portion,
   a U-shape chute having an inclined bottom wall in place on said base, a portion of said chute constituting a receptacle to receive uncracked nuts,
   bearing posts in place on said base with each post terminating upwardly in an eye, mounting means coacting on said base and said posts and adjustably mounting each of said posts relative said chute bottom wall,
   a drum rotatably carried within the eyes of said bearing posts and transversely disposed in said chute so as to locate a portion of the drum periphery adjacent said chute bottom wall whereby the drum and said bottom wall may coact to crack a nut therebetween, and
   means for imparting rotation to said drum.

2. The nutcracker claimed in claim 1 wherein said bearing posts are eye bolts, said mounting means including manually adjustable wing nuts in threaded engagement with said eye bolts, said drum including end located spindles one each journaled within an eye bolt eye.

3. The nutcracker claimed in claim 1 wherein said drum includes ribs at circumferentially spaced apart points, each rib having a curved segment protruding above the drum surface.

4. The nutcracker claimed in claim 2 additionally including angular brackets affixed to said chute, said brackets each defining an aperture for the passage of one of said bearing posts, said mounting means additionally serving to bias said brackets into base engagement for chute to base securement.

* * * * *